US011715071B2

(12) United States Patent
Yamane (10) Patent No.: US 11,715,071 B2
(45) Date of Patent: Aug. 1, 2023

(54) WRIST TERMINAL, WORK TIME MANAGEMENT METHOD, AND STORAGE MEDIUM (71) Applicant: CASIO COMPUTER CO., LTD., Tokyo (JP)

(72) Inventor: Kazuyasu Yamane, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 149 days.

(21) Appl. No.: 17/196,619

(22) Filed: Mar. 9, 2021

(65) Prior Publication Data
US 2021/0287180 A1 Sep. 16, 2021

(30) Foreign Application Priority Data

Mar. 10, 2020 (JP) .................. 2020-041040

(51) Int. Cl.
*G06Q 10/00* (2023.01)
*G06Q 10/1091* (2023.01)
(Continued)

(52) U.S. Cl.
CPC ......... *G06Q 10/1091* (2013.01); *G06F 1/163* (2013.01); *G06Q 10/063114* (2013.01); *G07C 1/10* (2013.01)

(58) Field of Classification Search
CPC ................ G06Q 10/1091; G06Q 10/063114
(Continued)

(56) References Cited

U.S. PATENT DOCUMENTS 8,112,281 B2 * 2/2012 Yeung .................. G06F 3/01
704/270
2007/0032748 A1 * 2/2007 McNeil ............... A61B 5/1121
600/595
(Continued)

FOREIGN PATENT DOCUMENTS

JP  2017-049449 A  3/2017
JP  2017-059891 A  3/2017
(Continued)

OTHER PUBLICATIONS

JPO; Application No. 2020-041040; Notice of Reasons for Refusal dated Feb. 22, 2022.
(Continued)

*Primary Examiner* — Rokib Masud
(74) *Attorney, Agent, or Firm* — Fitch, Even, Tabin & Flannery LLP (57) ABSTRACT A wrist terminal includes a communicator, timer, and at least one processor. The communicator receives a beacon ID transmitted from a beacon transmitter installed in a workplace. The timer obtains date-and-time information on a date and time at which the communicator receives the beacon ID. The processor performs a determining process and recording process. In the determining process, the processor determines whether a work status in the workplace is a work start or a work end, based on a state of the wrist terminal when the communicator receives the beacon ID. In the recording process, the processor records, in a storage, log information that includes the date-and-time information obtained by the timer and work status information on the work status determined in the determining process, the date-and-time information and the work status information being associated with each other.

13 Claims, 8 Drawing Sheets (51) Int. Cl.
  *G06F 1/16* (2006.01)
  *G06Q 10/0631* (2023.01)
  *G07C 1/10* (2006.01)
(58) Field of Classification Search
  USPC .......................................................... 705/32
  See application file for complete search history.

(56) References Cited

U.S. PATENT DOCUMENTS

2016/0299570 A1* 10/2016 Davydov ................ G06F 3/167
2019/0173953 A1*  6/2019 Feldhorst ................ H04L 67/12

FOREIGN PATENT DOCUMENTS

| JP | 2017191743 A1 * | 9/2017 | ............ G06Q 10/06 |
| JP | WO2019-039126 A1 | 2/2019 | |
| JP | 2019-036257 A | 3/2019 | |
| JP | 2019-102855 A | 6/2019 | |

OTHER PUBLICATIONS

EPO; Application No. 21160712.2; Extended European Search Report dated Aug. 11, 2021.

* cited by examiner

| DATE AND TIME | WORK STATUS | BEACON ID |
|---|---|---|
| 09:53 ON OCTOBER 29, 2019 | WORK START | 001 |
| 10:05 ON OCTOBER 29, 2019 | WORK END | 001 |
| 10:15 ON OCTOBER 29, 2019 | WORK START | 002 |
| 10:37 ON OCTOBER 29, 2019 | WORK END | 002 |

| WORKER ID | NAME |
|---|---|
| W0001 | ICHIRO SATO |
| W0002 | RYOKO SUZUKI |
| W0003 | YUSUKE YAMAGUCHI |

| BEACON ID | WORKPLACE |
|---|---|
| 001 | FIRST WORKPLACE |
| 002 | SECOND WORKPLACE |

| NAME | DATE | WORK TIME | | |
|---|---|---|---|---|
| | | FIRST WORKPLACE | SECOND WORKPLACE | TOTAL |
| ICHIRO SATO | ⋮ | ⋮ | ⋮ | ⋮ |
| | OCTOBER 29, 2019 | 12 MINUTES | 22 MINUTES | 34 MINUTES |
| RYOKO SUZUKI | ⋮ | ⋮ | ⋮ | ⋮ |
| | OCTOBER 29, 2019 | 10 MINUTES | 20 MINUTES | 30 MINUTES |
| YUSUKE YAMAGUCHI | ⋮ | ⋮ | ⋮ | ⋮ |
| | OCTOBER 29, 2019 | 11 MINUTES | 21 MINUTES | 32 MINUTES |

WRIST TERMINAL, WORK TIME MANAGEMENT METHOD, AND STORAGE MEDIUM

CROSS-REFERENCE TO RELATED APPLICATIONS

This application is based upon and claims the benefit of priority from the prior Japanese Patent Application No. 2020-041040 filed on Mar. 10, 2020, the entire disclosure of which is incorporated herein by reference.

BACKGROUND OF THE INVENTION

1. Technological Field

The present disclosure relates to a wrist terminal, a work time management method, and a storage medium.

2. Background

There is known a maintenance management technology for managing start and end of maintenance work. For example, JP2019-102855A discloses a maintenance management system. In the system, a beacon is set in a building as a target of maintenance. When a worker starts work in the building, a mobile terminal carried by the worker receives beacon information from the beacon and sends a building ID included in the beacon information to a monitoring device, thereby notifying the start of maintenance work in the building.

However, according to the maintenance management system disclosed in JP2019-102855A, when ending the work in the building, the worker has to perform an input operation with an operation receiver of the mobile terminal to notify that the maintenance ends. This requires time and effort.

SUMMARY

To deal with the above issues, according to an aspect of the present invention, there is provided a wrist terminal, including: a communicator that receives a beacon ID transmitted from a beacon transmitter installed in a workplace; a timer that obtains date-and-time information on a date and time at which the communicator receives the beacon ID; and at least one processor that performs: a determining process to determine whether a work status in the workplace is a work start or a work end, based on a state of the wrist terminal when the communicator receives the beacon ID; and a recording process to record, in a storage, log information that includes the date-and-time information obtained by the timer and work status information on the work status determined in the determining process, the date-and-time information and the work status information being associated with each other.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein.

DESCRIPTION OF EMBODIMENTS

Hereinafter, one or more embodiments of the present invention will be described with reference to the drawings. However, the scope of the present invention is not limited to the disclosed embodiments.

<Configuration of Work Time Management System 1>

Figure 1:
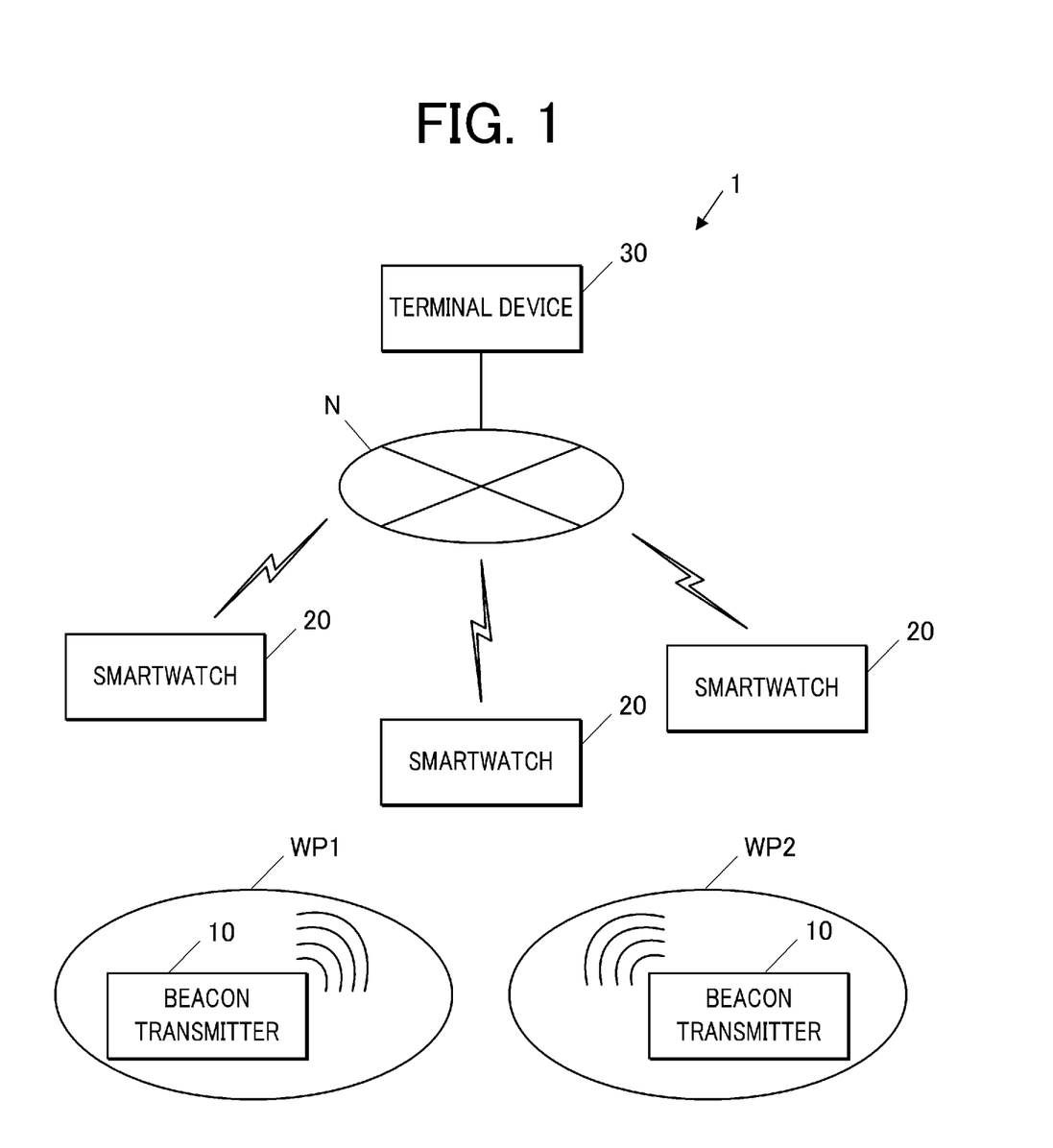
FIG. 1 shows components of a work time management system.

FIG. 1 shows components of a work time management system 1 in this embodiment. In the description below, the work time management system 1 is a system that measures work time of a first step and second step in a specific work.

As shown in FIG. 1, the work time management system 1 includes: beacon transmitters 10 that are installed in a first workplace WP1 and a second workplace WP2; smartwatches 20 worn by workers; and a terminal device 30. In the first workplace WP1, the first step is performed. In the second workplace WP2, the second step is performed. The smartwatches 20 are prepared as many as the number of workers. The number of smartwatches 20 is not limited to a specific number.

Figure 2:
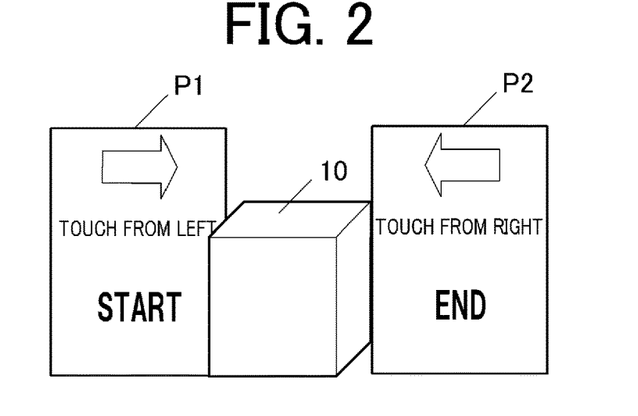
FIG. 2 shows how a beacon transmitter is installed in each workplace.

FIG. 2 shows how the beacon transmitter 10 is installed in each of the workplaces WP1, WP2.

As shown in FIG. 2, the beacon transmitter 10 is installed on the wall of each of the workplaces WP1, WP2, for example. On the left wall of the beacon transmitter 10, a sheet P1 is attached. P1 notifies the worker the position to be touched with the smartwatch 20 in starting work in the workplace. On the right wall of the beacon transmitter 10, a sheet P2 is attached. P2 notifies the worker the position to be touched with the smartwatch 20 in ending work in the workplace. It is preferable that the beacon transmitter 10 be placed approximately as high as the worker's chest. The information on the sheet P1 may be written on the left-side surface of the beacon transmitter 10, instead of using the sheet P1. Similarly, the information on the sheet P2 may be written on the right side surface of the beacon transmitter 10, instead of using the sheet P2.

Figure 3A:
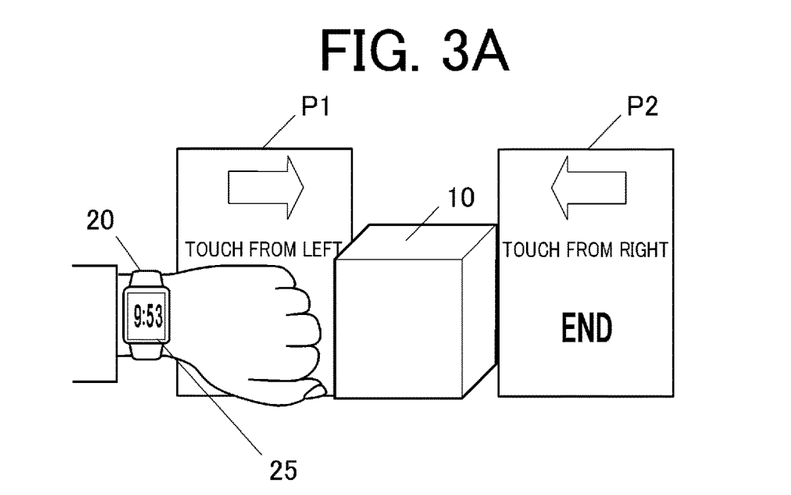
FIG. 3A shows how a worker actually touches the beacon transmitter with a smartwatch when starting work in each workplace.

FIG. 3A shows how the worker actually touches the beacon transmitter 10 with the smartwatch 20 when starting work in each workplace WP1/WP2. Herein, the worker wears the smartwatch 20 on his/her left wrist such that a display 25 of the smartwatch 20 is located at the back of the wrist.

As shown in FIG. 3A, when starting work in each workplace WP1/WP2, the worker refers to the information on the sheet P1 and brings the smartwatch 20, which is worn on the back of the left wrist, closer to the left-side surface of the beacon transmitter 10 from the left of the beacon transmitter 10, to touch the beacon transmitter 10. The worker touches the left side surface of the beacon transmitter 10 with the smartwatch 20 such that the top in the top-bottom direction of the display 25 of the smartwatch 20 faces upwards.

Figure 3B:
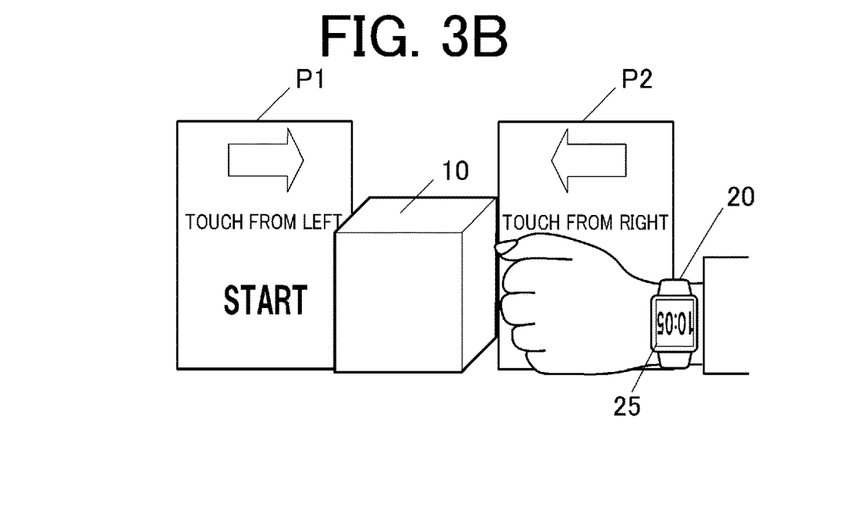
FIG. 3B shows how the worker actually touches the beacon transmitter with the smartwatch when ending work in each workplace.

FIG. 3B shows how the worker actually touches the beacon transmitter 10 with the smartwatch 20 when ending work in each workplace WP1/WP2.

As shown in FIG. 3B, when ending work in each workplace WP1/WP2, the worker refers to the information on the sheet P2 and brings the smartwatch 20, which is worn on the back of the left wrist, closer to the right side surface of the beacon transmitter 10, to touch the beacon transmitter 10. The worker touches the right side surface of the beacon transmitter 10 with the smartwatch 20 such that the top in the top-bottom direction of the display 25 of the smartwatch 20 faces downwards.

<Configuration of Beacon Transmitter 10>

The beacon transmitter 10 transmits beacon information at predetermined time intervals over a communication method, such as Bluetooth (registered trademark) Low Energy (BLE). The beacon information includes a predetermined beacon ID. The beacon ID is identification information to identify the beacon transmitter 10. In this embodiment, the workplace WP1/WP2 can be identified according to the beacon ID transmitted by the beacon transmitter 10, which is installed in the workplace WP1/WP2. The strength of signals transmitted by the beacon transmitter 10 is set such that the beacon transmitter 10 has the communication range of several centimeters to several tens of centimeters, for example.

<Configuration of Smartwatch 20>

Next, a configuration of the smartwatch 20 is described with reference to FIG. 4.

Figure 4:
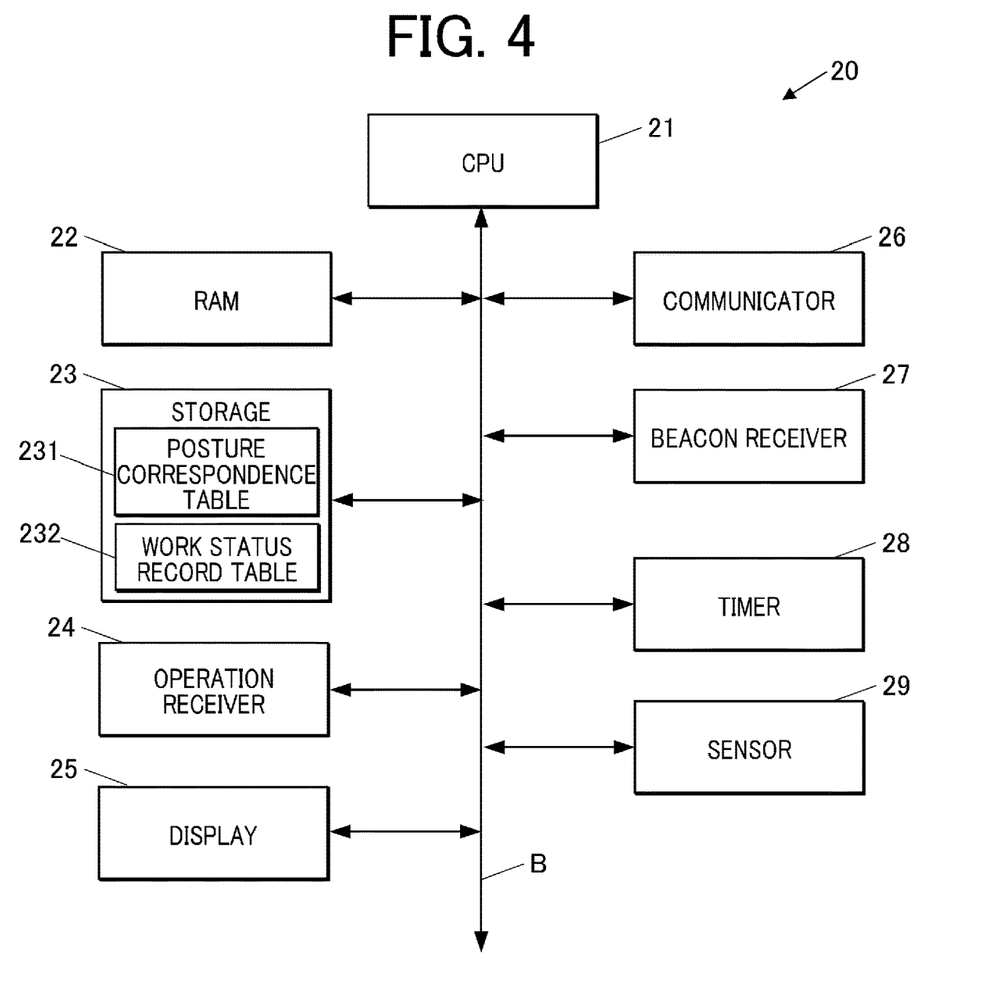
FIG. 4 is a block diagram of functional components of the smartwatch.

FIG. 4 is a block diagram of functional components of the smartwatch 20.

As shown in FIG. 4, the smartwatch 20 (wrist terminal) includes: a central processing unit (CPU) 21, a random access memory (RAM) 22, a storage 23, an operation receiver 24, the display 25, a communicator 26, a beacon receiver 27, a timer 28, and a sensor 29. These components are connected via a bus B.

The CPU 21 (obtaining unit, determining unit, recording unit, receiving unit) is a processor that controls the components of the smartwatch 20. The CPU 21 reads a program stored in the storage 23, loads the program into the RAM 22, and executes the program to perform various arithmetic processes.

The RAM 22 provides the CPU 21 with a working memory space and stores temporary data. The RAM 22 may include a non-volatile memory.

The storage 23 includes a storage device, such as a flash memory on which data can be written and from which data can be read. The storage 23 stores files including various programs, data, and so forth. The data to be stored in the storage 23 includes a posture correspondence table 231 and a work status record table 232.

Figure 5:
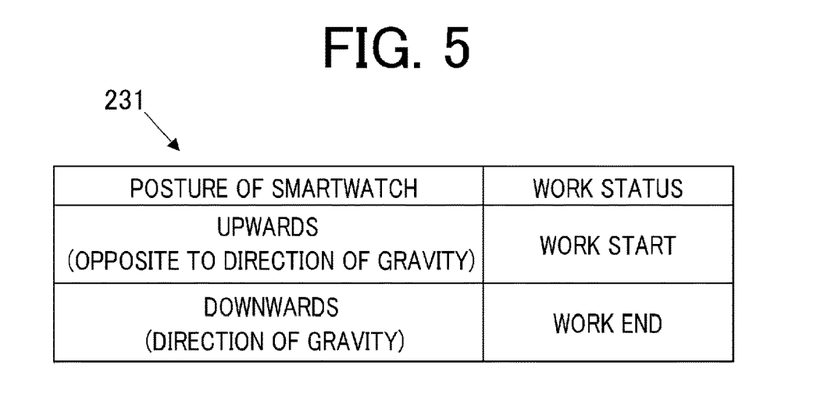
FIG. 5 is an example of contents of a posture correspondence table.

FIG. 5 is an example of contents of the posture correspondence table 231. The posture correspondence table 231 is a table to determine the work status according to the posture of the smartwatch 20. As shown in FIG. 5, in the posture correspondence table 231, information items on the posture of the smartwatch 20 (direction of the top of the display 25 in the top-bottom direction) are associated with information items on the work status. More specifically, an information item "upwards (opposite to direction of gravity)" is associated with an information item "work start". Further, an information item "downwards (direction of gravity)" is associated with an information item "work end". When the top in the top-bottom direction of the display 25 of the smartwatch 20 faces upwards, the work status is determined as work start. When the top in the top-bottom direction of the display 25 of the smartwatch 20 faces downwards, the work status is determined as work end.

In the posture correspondence table 231, the information item on the work status "work start" corresponds to the information item on the posture of the smartwatch 20 "upwards (opposite to direction of gravity)". Further, the information item on the work status "work end" corresponds to the information item on the posture of the smartwatch 20 "downwards (direction of gravity)", as an example. However, the correspondences between the information items on the posture of the smartwatch 20 and the information items on the work status may be changed as desired. Further, the information items on the posture of the smartwatch 20 are not limited to above-described "upwards (opposite to direction of gravity)" and "downwards (direction of gravity)". The information items on the work status are also not limited to the above-described "work start" and "work end". The information items on the work status may be "work stop (e.g., start taking a rest)" and "work start (e.g., end the rest)".

Figure 6:
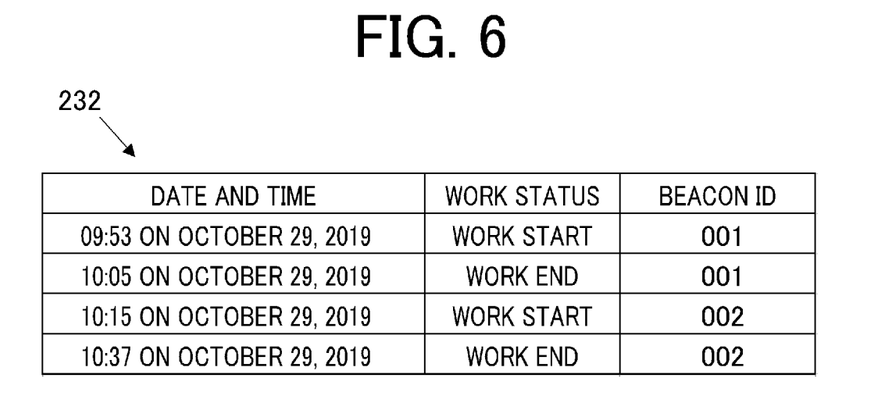
FIG. 6 is an example of contents of a work status record table.

FIG. 6 is an example of contents of the work status record table 232.

The work status record table 232 (storage) is a table to record the work statuses in the first and second workplaces WP1, WP2. As shown in FIG. 6, the work status record table 232 records information items on (i) a date and time at which a beacon ID is received, (ii) the work status (work start/work end) at the date and time, and (iii) the received beacon ID. The information items on (i) to (iii) are associated with each other.

The operation receiver 24 includes a push-button switch(es) and a touch sensor provided on the display 25. The operation receiver 24 receives input operations by a user, converts the contents of the input operations into electric signals, and outputs the electric signals to the CPU 21.

The display 25 includes a liquid crystal display (LCD) and performs display in accordance with display control signals from the CPU 21. The touch sensor is provided on the display screen of the display 25. The display 25 functions as a touchscreen that displays operations.

The communicator 26 wirelessly connects to a communication network N (FIG. 1), for example. The communicator 26 communicates with external devices connected to the communication network N.

The beacon receiver 27 communicates with the beacon transmitter 10 wirelessly at close range over the BLE. The beacon receiver 27 receives beacon information transmitted from the beacon transmitter 10 and outputs the received information to the CPU 21.

The timer 28 includes, for example, a timekeeper and a timer circuit. The timer 28 measures the current date and time and outputs date-and-time information on the date and time to the CPU 21.

The sensor 29 includes a three-axis acceleration sensor, for example. The sensor 29 outputs acceleration data measured by the three-axis acceleration sensor to the CPU 21.

<Configuration of Terminal Device 30>

Next, a configuration of the terminal device 30 is described with reference to FIG. 7.

Figure 7:
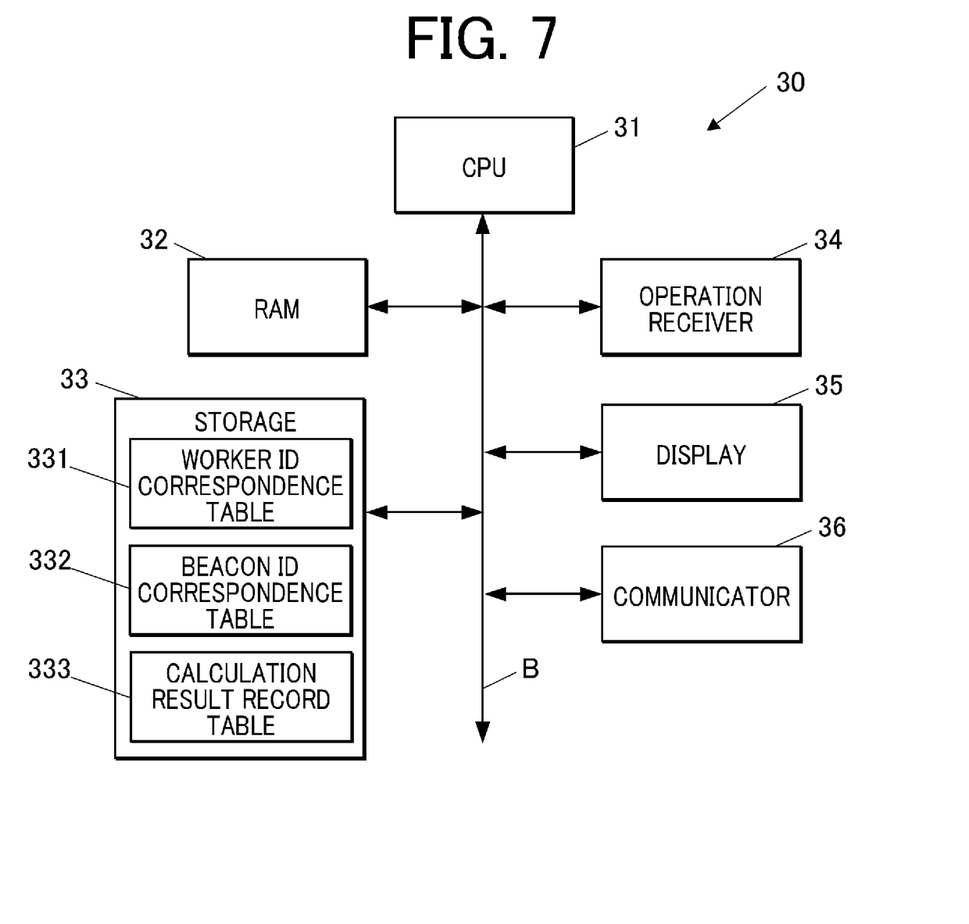
FIG. 7 is a block diagram of functional components of a terminal device.

FIG. 7 is a block diagram of functional components of the terminal device 30.

As shown in FIG. 7, the terminal device 30 (information processing device) includes: a CPU 31, a RAM 32, a storage 33, an operation receiver 34, a display 35, and a communicator 36. These components are connected via a bus B. Examples of the terminal device 30 include a laptop personal computer (PC) and a desktop PC.

The CPU 31 (log information obtaining unit, calculating unit) is a processor that controls the components of the terminal device 30. The CPU 21 reads a program stored in the storage 33, loads the program into the RAM 32, and executes the program to perform various arithmetic processes.

The RAM 32 provides the CPU 31 with a working memory space and stores temporary data. The RAM 32 may include a non-volatile memory.

The storage 33 includes a storage device, such as a hard disk drive (HDD), a solid state drive (SSD), or a flash memory on which data can be written and from which data can be read. The storage 33 stores files including various programs and data. The data stored in the storage 33 includes a worker ID correspondence table 331, a beacon ID correspondence table 332, and a calculation result table 333.

Figure 8:
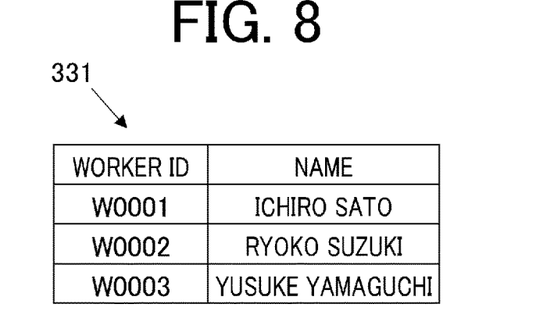
FIG. 8 is an example of contents of a worker ID correspondence table.

FIG. 8 is an example of contents of the worker ID correspondence table 331.

The worker ID correspondence table 331 is a table to identify names of workers according to worker IDs. As shown in FIG. 8, the worker ID correspondence table 331 includes information items on the worker ID and the name of worker. Information items on the worker ID (e.g., "W0001") are recorded in association with information items on the name of worker (e.g., "Ichiro Sato").

Figure 9:
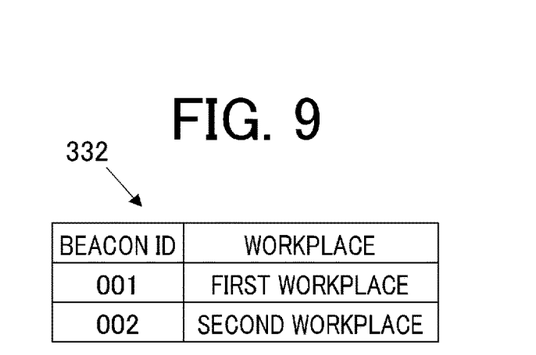
FIG. 9 is an example of contents of a beacon ID correspondence table.

FIG. 9 is an example of contents of the beacon ID correspondence table 332.

The beacon ID correspondence table 332 is a table to identify workplaces according to beacon IDs. As shown in FIG. 9, the beacon ID correspondence table 332 includes information items on the beacon ID and on the workplace. The information item on the beacon ID "001" is associated with the information item on the workplace "first workplace". Further, the information item on the beacon ID "002" is associated with the information item on the workplace "second workplace".

Figure 10:
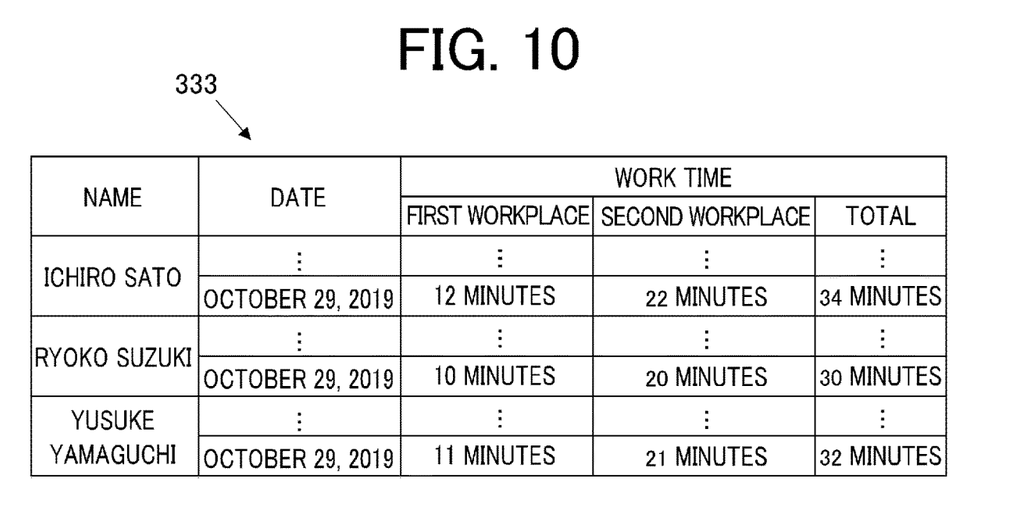
FIG. 10 is an example of contents of a calculation result table.

FIG. 10 is an example of contents of the calculation result table 333.

The calculation result table 333 is a table to record work times (calculation result) spent for specific works. As shown in FIG. 10, in the calculation result table 333, each worker is recorded in association with the date on which the worker performed a specific work and the work times. The work times include the work time in the workplace WP1, the work time in the workplace WP2, and the total of these work times.

The operation receiver 34 includes a key input receiver, such as a keyboard, and a pointing device, such as a mouse. The operation receiver 34 receives inputs with key operation and inputs with position change operation by a user (supervisor who supervises the workers) and outputs the information on the operation to the CPU 31. Based on the information sent from the operation receiver 34, the CPU 31 receives the input operation by the user.

The display 35 includes an LCD, for example and performs display in accordance with display control signals from the CPU 31.

The communicator 36 wirelessly connects to the communication network N (FIG. 1), for example. The communicator 26 communicates with external devices connected to the communication network N.

<Operation of Work Time Management System>

Next, the operation of the work time management system 1 is described with reference to FIGS. 11 and 12.

[Log Information Recording Process]

Figure 11:
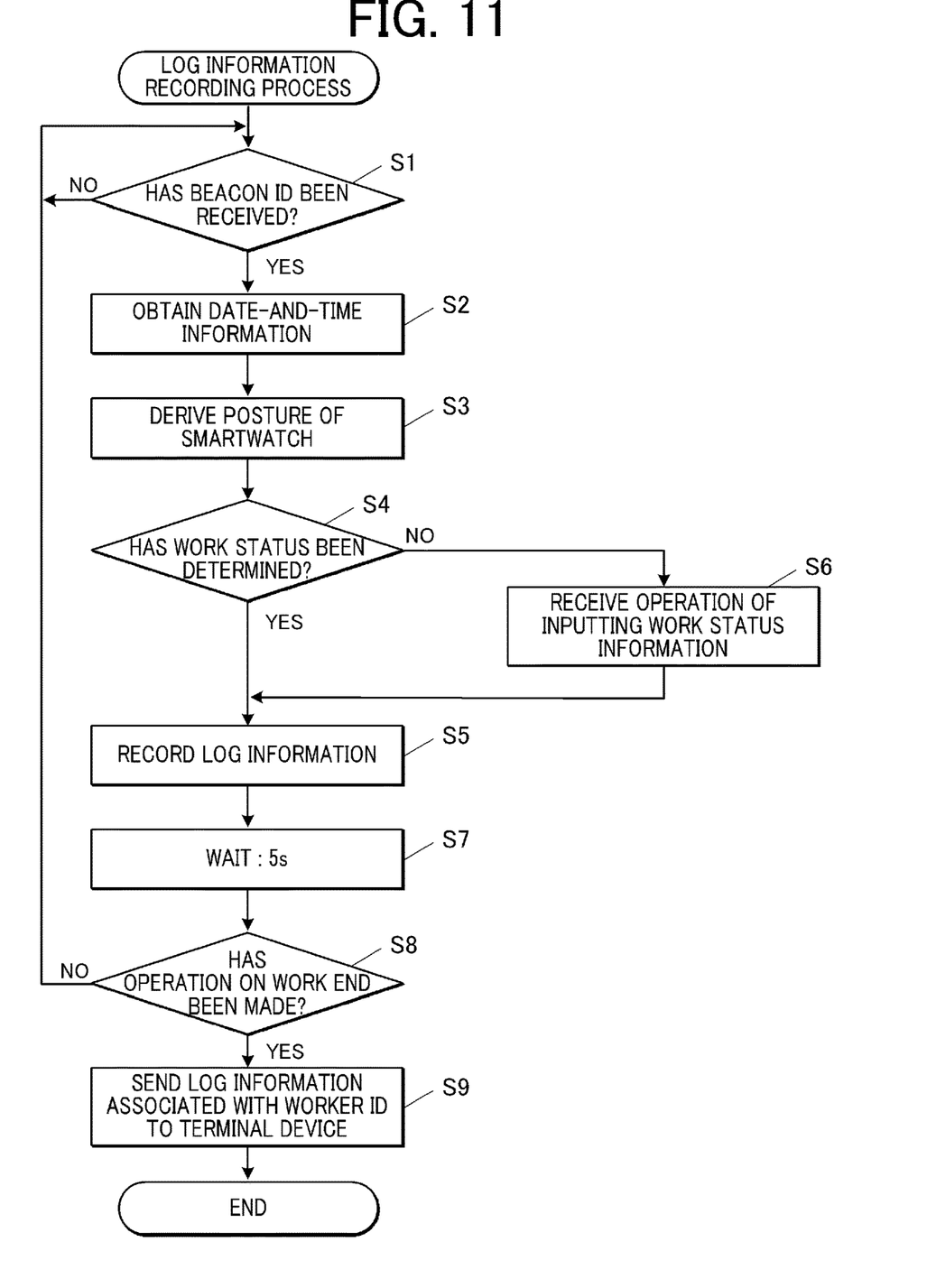
FIG. 11 is a flowchart of a control procedure of a log information recording process.

FIG. 11 is a flowchart of a control procedure of the log information recording process that is performed by the smartwatch 20.

As shown in FIG. 11, when the log information recording process starts, the CPU 21 of the smartwatch 20 determines whether or not the beacon receiver 27 has received a beacon ID (beacon information) from the beacon transmitter 10 installed in the first workplace WP1 or the second workplace WP2 (Step S1).

When determining that the beacon receiver 27 has not received a beacon ID from the beacon transmitter 10 installed in the first workplace WP1 or the second workplace WP2 (Step S1: NO), the CPU 21 repeats Step S1 until receiving a beacon ID.

When determining that the beacon receiver 27 has received a beacon ID from the beacon transmitter 10 installed in the first workplace WP1 or the second workplace WP2 (Step S1: YES), the CPU 21 obtains date-and-time information at the time of receiving the beacon ID (Step S2).

Next, the CPU 21 derives the posture of the smartwatch 20 at the time of receiving the beacon ID (Step S3). More specifically, the CPU 21 obtains, from the sensor 29, acceleration data at the time of receiving the beacon ID. Based on the acceleration data, the CPU 21 derives the direction to which the top in the top-bottom direction of the display 25 of the smartwatch 20 faces (Step S3).

Next, the CPU 21 refers to the posture correspondence table 231 and determines whether or not the work status is determined based on the direction derived in Step S3, in which the top in the top-bottom direction of the display 25 of the smartwatch 20 faces (Step S4). For example, when the top in the top-bottom direction of the display 25 of the smartwatch 20 faces upwards in Step S3 as shown in FIG. 3A (opposite to direction of gravity), the CPU 21 refers to the posture correspondence table 231 and determines that the work status is work start. When the top in the top-bottom direction of the display 25 of the smartwatch 20 faces downwards in Step S3 as shown in FIG. 3B, the CPU 21 refers to the posture correspondence table 231 and determines that the work status is work end.

When determining that the work status is determined (Step S4: YES), the CPU 21 records log information in the work status record table 232 (Step S5). The log information includes: the beacon ID (e.g., "001") received in Step S1; the date-and-time information (e.g., 09:53 on Oct. 29, 2019) obtained in Step S2; and the work status information on the work status determined in Step S4 (e.g., "work start").

When determining that the work status is not determined (Step S4: NO), the CPU 21 causes the display 25 to display a notification, such as sentences of "work status cannot be determined", as well as outputting beep sounds or generating vibrations. The CPU 21 also receives an input operation of inputting work status information ("work start" or "work end") with the operation receiver 24 (Step S6). The CPU 21 then records in the work status record table 232 the log information, which includes the beacon ID received in Step S1, the date-and-time information obtained in Step S2, and the work status information received in Step S6 (Step S5).

Next, the CPU 21 performs a wait process for five seconds (Step S7). The five-second wait process is performed to avoid duplicately receiving the beacon ID, which is continuously transmitted by the beacon transmitter 10.

Next, the CPU 21 determines whether or not an operation of work end has been made with the operation receiver 24 (Step S8). The operation of work end notifies that the work in the first workplace WP1 or the second workplace WP2 ends.

When determining that an operation of work end has not been made (Step S8: NO), the CPU 21 returns to Step S1 and repeats the process of Step S1 and thereafter.

When determining that an operation of work end has been made (Step S8: YES), the CPU 21 associates the log information recorded in Step S5 with the worker ID for identifying the worker who wears the smartwatch 20, and sends the log information to the terminal device 30 (Step S9). The CPU 21 then ends the log information recording process.

[Work Time Calculating Process]

Figure 12:
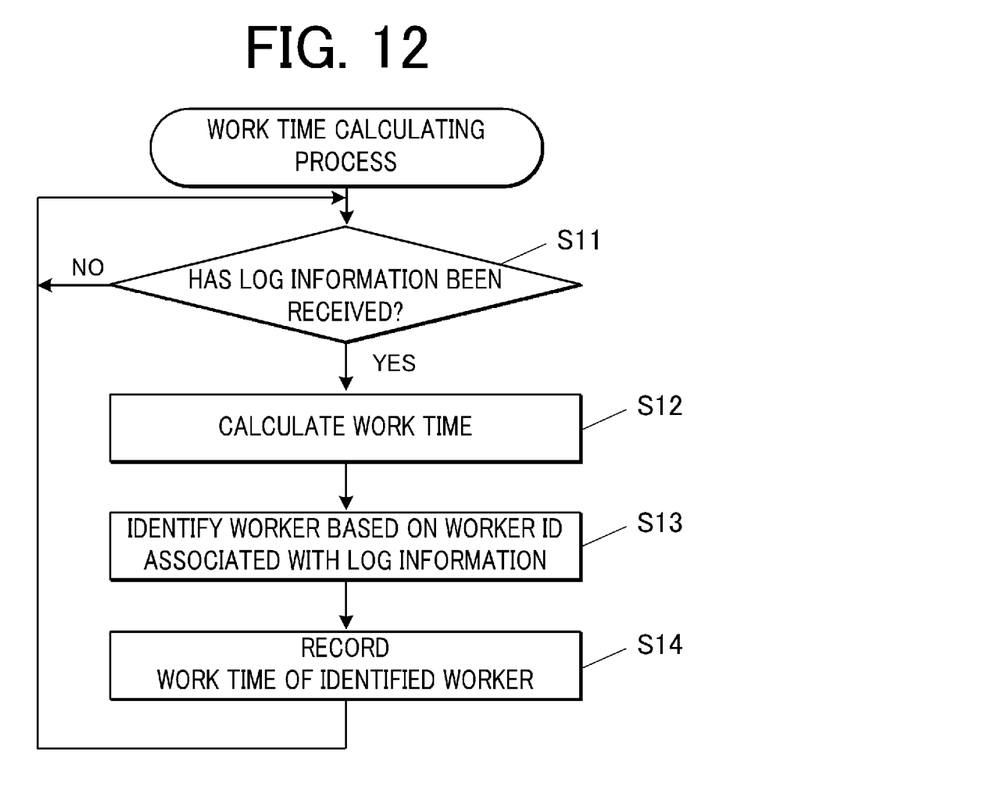
FIG. 12 is a flowchart of a control procedure of a work time calculating process.

FIG. 12 is a flowchart of a control procedure of a work time calculating process that is performed by the terminal device 30.

As shown in FIG. 12, when the work time calculating process starts, the CPU 31 of the terminal device 30 determines whether or not the log information has been received from the smartwatch 20 (Step 11).

When determining that the log information has not been received from the smartwatch 20 (Step 11: NO), the CPU 31 repeats Step S11 until receiving the log information.

When determining that the log information has been received from the smartwatch 20 (Step 11: YES), the CPU 31 calculates work times based on the log information (Step S12).

More specifically, assume that the CPU 31 receives four pieces of log information shown in FIG. 6. For the first log information that includes (i) the beacon ID of "001", (ii) the work status information of "work start", and (iii) the date-and-time information of "09:53 on Oct. 29, 2019", the CPU 31 extracts a piece of log information that includes (i) the same beacon ID, (ii) the work status information of "work end", and (iii) the date-and-time information of the date and time immediately after "09:53 on Oct. 29, 2019". That is, the CPU 31 extracts the second log information that includes (i) the beacon ID of "001", (ii) the work status information of "work end", and (iii) the date-and-time information of "10:05 on Oct. 29, 2019". The CPU 31 calculates the difference in date and time between these two pieces of log information as a work time. Herein, the difference is 12 minutes. The CPU 31 also refers to the beacon ID correspondence table 332 and identifies the beacon ID "001" as "first workplace".

Similarly, for the third log information that includes (i) the beacon ID of "002", (ii) the work status information of "work start", and (iii) the date-and-time information of "10:15 on Oct. 29, 2019", the CPU 31 extracts a piece of log information that includes (i) the same beacon ID, (ii) the work status information of "work end", and (iii) the date-and-time information of the date and time immediately after "10:15 on Oct. 29, 2019". That is, the CPU 31 extracts the fourth log information that includes (i) the beacon ID of "002", (ii) the work status information of "work end", and (iii) the date-and-time information of "10:37 on Oct. 29, 2019". The CPU 31 calculates the difference in date and time between these two pieces of log information as a work time. Herein, the difference is 22 minutes. The CPU 31 also refers to the beacon ID correspondence table 332 and identifies the beacon ID "002" as "second workplace".

Next, the CPU 31 identifies the worker, based on the worker ID associated with the log information received in Step S11 (Step S13). For example, when the worker ID associated with the log information is "W0001", the CPU 31 refers to the worker ID correspondence table 331 and identifies the worker ID "W0001" as the worker "Ichiro Sato".

Next, the CPU 31 records the work times of the worker who has been identified in Step S13 in the calculation result table 333 (Step S14). More specifically, assume that the CPU 31 identifies "Ichiro Sato" based on the worker ID and calculates the work time in the first workplace WP1 as 12 minutes and the work time in the second workplace WP2 as 22 minutes, as described above. The CPU 31 records (i) the information item on the date "Oct. 29, 2019", (ii) the information item on the first workplace "12 minutes", (iii) the information item on the second workplace "22 minutes", and (iv) the total of the work times in the first and second workplaces "34 minutes". As shown in FIG. 10, the information items on (i) to (iv) are associated with each other and recorded in their respective sections corresponding to "Ichiro Sato" in the calculation result table 333. Herein, the information item on the date is the date indicated by the date-and-time information in the log information received from the smartwatch 20. The information item on the total is the total of the corresponding information items of the first and second workplaces. The CPU 31 then returns to Step S11 and repeats the process of Step S11 and thereafter.

As described above, the smartwatch 20 in the embodiment receives a beacon ID transmitted from the beacon transmitter 10 installed in each of the workplaces WP1, WP2, and obtains date-and-time information on the date and time at which the beacon transmitter 27 receives the beacon ID. The smartwatch 20 then determines whether a work status in the workplace WP1/WP2 is work start or work end, based on the state of the smartwatch 20 when the beacon transmitter 27 receives the beacon ID. The smartwatch 20 then records, in the work status record table 232 in the storage 23, log information that includes the date-and-time information and work status information on the determined work status, the date-and-time information and the work status information being associated with each other.

By being made in different states in receiving the beacon ID from the beacon transmitter 10 installed in the workplace WP1/WP2, the smartwatch 20 can record the date and time of the work start and the work end. This allows the worker to notify the work start and work end easily and smoothly.

Further, the smartwatch 20 in the embodiment determines whether the work status in the workplace WP1/WP2 is work start or work end, based on the posture of the smartwatch 20 when the beacon receiver 27 receives the beacon ID.

By simply being made in different postures in receiving the beacon ID from the beacon transmitter 10 installed in the workplace WP1/WP2, the smartwatch 20 can record the date and time of the work start and the work end. This allows the worker to notify the work start and work end further easily and smoothly.

Further, the smartwatch 20 in the embodiment determines that the work status in the workplace WP1/WP2 is the work start when the top in the top-bottom direction of the display 25 faces upwards when the beacon receiver 27 receives the beacon ID. On the other hand, the smartwatch 20 determines that the work status in the workplace WP1/WP2 is the work end when the top of the display 25 faces downwards when the beacon receiver 27 receives the beacon ID.

Thus, in starting work in each of the workplaces WP1, WP2, the worker can touch the beacon transmitter 10 with the smartwatch 20 such that the top in the top-bottom direction of the display 25 faces upwards, while checking the current time on the display 25. On the other hand, in ending work in each of the workplaces WP1, WP2, the worker may have to touch the beacon transmitter 10 with the smartwatch 20 immediately without checking the current time on the display 25. According to the embodiment, the worker can touch the beacon transmitter 10 with the smartwatch 20 in a natural manner such that the top in the top-bottom direction of the display 25 faces downwards. This allows the worker to notify the work start and work end further smoothly.

Further, when the work status in the workplace WP1/WP2 is not determined, the smartwatch 20 in the embodiment receives an input operation of inputting the work status information. The smartwatch 20 associates the received work status information with the corresponding date-and-time information and stores the associated information in the work status record table 232 in the storage 23 as the log information.

Thus, when the work status in the workplace WP1/WP2 is not determined, the smartwatch 20 receives operation of inputting the work status. The smartwatch 20 thus makes sure to record the date and time of the work start and work end. This allows the worker to notify the work start and work end appropriately.

Further, the work time management system 1 in the embodiment includes beacon transmitters 10 installed in the workplaces WP1, WP2 and a smartwatch(es) 20. The smartwatch 20 receives a beacon ID transmitted from the beacon transmitter 10 installed in each of the workplaces WP1, WP2, and obtains date-and-time information on the date and time at which the beacon transmitter 27 receives the beacon ID. The smartwatch 20 then determines whether the work status in the workplace WP1/WP2 is work start or work end, based on the state of the smartwatch 20 when the beacon transmitter 27 receives the beacon ID. The smartwatch 20 then records, in the work status record table 232 in the storage 23, log information that includes the date-and-time information and work status information on the determined work status, the date-and-time information and the work status information being associated with each other.

According to the work time management system 1, the workplaces WP1, WP2 do not need a beacon transmitter to record date and time of the work start and work end. This can reduce spaces and costs.

The above embodiment is an example of the wrist terminal and the work time management system according to the present invention, and is not intended to limit the present invention.

For example, in the above embodiment, the smartwatch 20 determines whether the work status in the workplace WP1/WP2 is work start or work end, based on the posture of the smartwatch 20 at the time of receiving the beacon ID. Alternatively, the smartwatch 20 may determine whether the work status in workplace WP1/WP2 is work start or work end, based on the moving speed of the smartwatch 20 at the time of receiving the beacon ID, namely at the time when the worker brings the smartwatch 20 towards the beacon transmitter 10.

Further, in the above embodiment, the terminal device 30 calculates the work times in the respective workplaces WP1, WP2, based on the log information recorded by the smartwatch 20. Alternatively, the smartwatch 20 itself may be configured to calculate the work times in the workplaces WP1, WP2.

Further, in the work time management system 1 of the above embodiment, the beacon transmitters 10 are installed in the workplaces WP1, WP2. Instead of the beacon transmitters 10, transmitter devices 40 each of which includes a near field communication (NFC) unit 40A may be installed in the workplaces WP1, WP2, as shown in a work time management system 1A in FIG. 13. The NFC unit 40A is capable of wirelessly communicating with the smartwatch 20 at close range. In the work time management system 1A, the terminal device 30A receives, from the smartwatch 20, (i) state information on the state of the smartwatch 20 when the smartwatch 20 communicates with the NFC unit 40A (e.g., posture information of the smartwatch 20) and (ii) the terminal ID (worker ID) for identifying the smartwatch 20, via the transmitter device 40 with the NFC unit 40A. The terminal device 30A also obtains date-and-time information at the time of receiving the state information. Based on the received state information, the terminal device 30A determines whether the work status in the workplace WP1/WP2 is work start or work end. The terminal device 30A then associates work status information on the determined work status with the terminal ID (worker ID) and records the associated information as log information in a storage (not illustrated) of the terminal device 30A.

Figure 13:
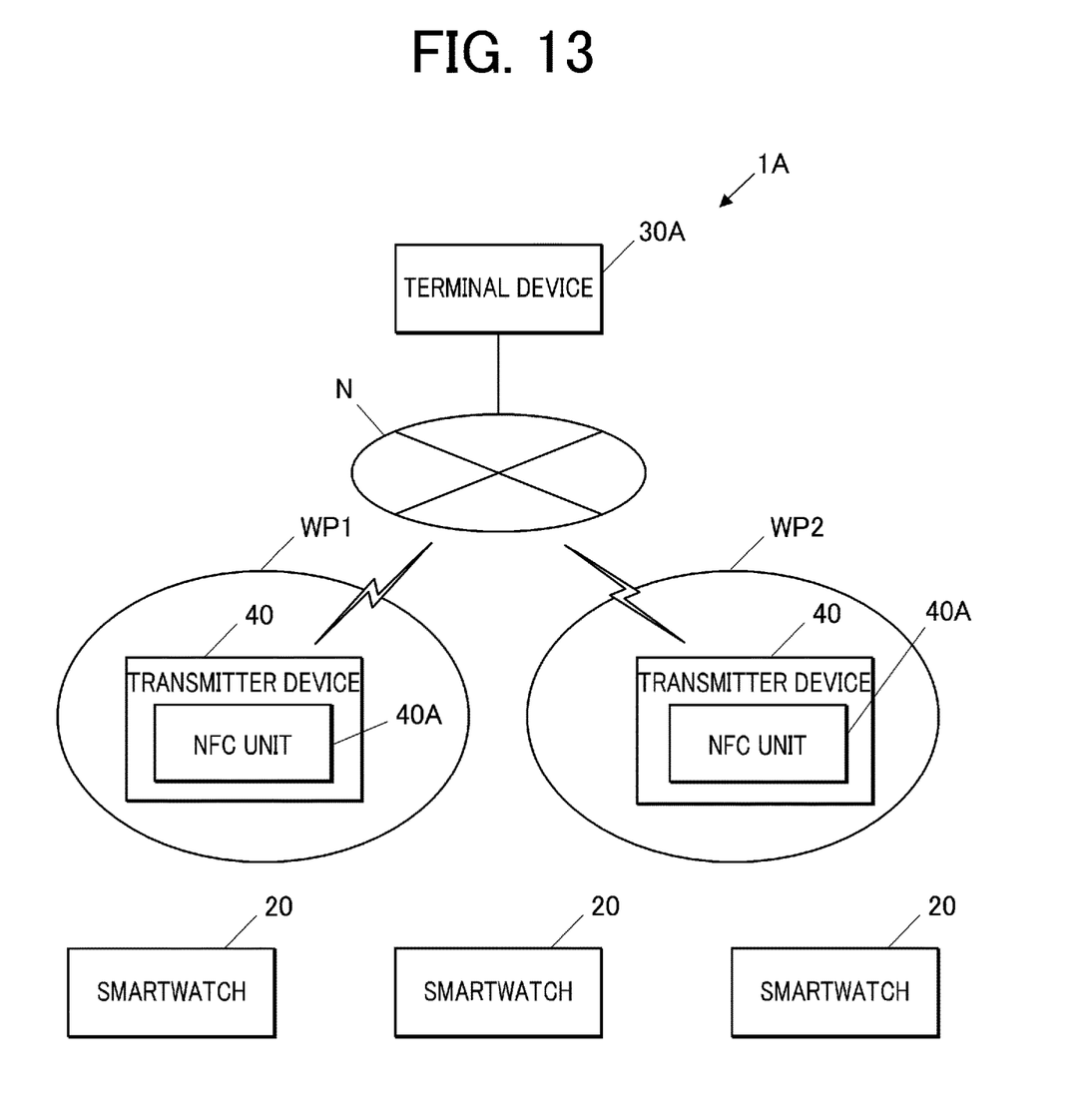
FIG. 13 shows components of a work time management system in a modification.

In the work time management system 1A, the smartwatch 20 is made to be in different states (e.g., different postures) for different work statuses when wirelessly communicating at close range with the transmitter device 40 installed in each of the workplaces WP1, WP2, and the terminal device 30 records the date and time of work start and work end. This allows the worker to notify the work start and the work end smoothly and easily. The NFC unit 40A may be integrated with the transmitter device 40 or may be externally attached to the transmitter device 40.

Although the embodiments of the present invention have been described, the scope of the present invention is not limited to the above embodiment but includes the scope of the present invention described in the scope of claims and the scope of their equivalents.

What is claimed is:

1. A wrist terminal, comprising:
   an acceleration sensor that measures acceleration data;
   a communicator that receives a beacon ID transmitted from a beacon transmitter installed in a workplace;
   a timer that obtains date-and-time information on a date and time at which the communicator receives the beacon ID; and
   at least one processor that performs:
   a determining process to determine whether a work status in the workplace is a work start or a work end, based on a posture of the wrist terminal when the communicator receives the beacon ID, the posture being derived from the acceleration data measured by the acceleration sensor, wherein the processor determines that the work status is the work start when the posture of the wrist terminal is a first posture and that the work status is the work end when the posture of the wrist terminal is a second posture; and a recording process to record, in a storage, log information that includes the date-and-time information obtained by the timer and work status information on the work status determined in the determining process, the date-and-time information and the work status information being associated with each other.

2. The wrist terminal according to claim 1, wherein the wrist terminal is worn on a left wrist of a user such that a display of the wrist terminal is placed at a back of the left wrist, and in the determining process, the processor
  determines that the work status in the workplace is the work start in response to a top in a top-bottom direction of the display facing upwards when the communicator receives the beacon ID, and
  determines that the work status in the workplace is the work end in response to the top of the display facing downwards when the communicator receives the beacon ID.

3. The wrist terminal according to claim 1, further comprising an operation receiver that receives an input operation of inputting the work status information, wherein
  in response to the work status not being determined in the determining process, the operation receiver receives the input operation, and
  in response to the operation receiver receiving the input operation, in the recording process, the processor associates the work status information received by the operation receiver with the date-and-time information and stores the associated information in the storage as the log information.

4. The wrist terminal according to claim 1, wherein the processor further performs a calculating process to calculate a work time in the workplace based on the log information recorded in the storage.

5. A work time management method that is performed by a wrist terminal that includes: a communicator that receives a beacon ID transmitted from a beacon transmitter installed in a workplace; and a timer that obtains date-and-time information on a date and time at which the communicator receives the beacon ID, the method comprising:
  an acceleration sensor that measures acceleration data;
  determining that is determining whether a work status in the workplace is a work start or a work end, based on a posture of the wrist terminal when the communicator receives the beacon ID, the posture being derived from the acceleration data measured by the acceleration sensor, wherein the processor determines that the work status is the work start when the posture of the wrist terminal is a first posture and that the work status is the work end when the posture of the wrist terminal is a second posture; and
  recording that is recording, in a storage, log information that includes the date-and-time information obtained by the timer and work status information on the work status determined in the determining, the date-and-time information and the work status information being associated with each other.

6. The method according to claim 5, wherein the wrist terminal is worn on a left wrist of a user such that a display of the wrist terminal is placed at a back of the left wrist, and
  in the determining, the work status in the workplace is determined as the work start in response to a top in a top-bottom direction of the display facing upwards when the communicator receives the beacon ID, and
  in the determining, the work status in the workplace is determined as the work end in response to the top of the display facing downwards when the communicator receives the beacon ID.

7. The method according to claim 5, wherein the wrist terminal further includes an operation receiver that receives an input operation of inputting the work status information, and
  in response to the work status not being determined in the determining, the operation receiver receives the input operation, and
  in response to the operation receiver receiving the input operation, in the recording, the work status information received by the operation receiver is associated with the date-and-time information and stored in the storage as the log information.

8. The method according to claim 5, further including calculating that is calculating a work time in the workplace, based on the log information recorded in the storage.

9. A non-transitory computer readable storage medium storing a program that is able to be performed by a processor of a wrist terminal, the wrist terminal including a communicator that receives a beacon ID transmitted from a beacon transmitter installed in a workplace and a timer that obtains date-and-time information on a date and time at which the communicator receives the beacon ID, wherein the program causes the processor to perform:
  a determining process to determine whether a work status in the workplace is a work start or a work end, based on a posture of the wrist terminal when the communicator receives the beacon ID, the posture being derived from the acceleration data measured by the acceleration sensor, wherein the processor determines that the work status is the work start when the posture of the wrist terminal is a first posture and that the work status is the work end when the posture of the wrist terminal is a second posture; and
  a recording process to record, in a storage, log information that includes the date-and-time information obtained by the timer and work status information on the work status determined in the determining process, the date-and-time information and the work status information being associated with each other.

10. The storage medium according to claim 3, wherein the wrist terminal is worn on a left wrist of a user such that a display of the wrist terminal is placed at a back of the left wrist, and
  in the determining process, the work status in the workplace is determined as the work start in response to a top in a top-bottom direction of the display facing upwards when the communicator receives the beacon ID, and
  in the determining process, the work status in the workplace is determined as the work end in response to the top of the display facing downwards when the communicator receives the beacon ID.

11. The storage medium according to claim 9, wherein the wrist terminal further includes an operation receiver that receives an input operation of inputting the work status information, and
  in response to the work status not being determined in the determining process, the operation receiver receives the input operation, and
  in response to the operation receiver receiving the input operation, in the recording process, the work status information received by the operation receiver is associated with the date-and-time information and stored in the storage as the log information.

12. The storage medium according to claim 9, wherein the program further causes the processor to perform a calculating process to calculate a work time in the workplace based on the log information recorded in the storage.

13. The wrist terminal according to claim 1, wherein the first posture is an inverse posture to the second posture with respect to a top-bottom direction.

* * * * *

UNITED STATES PATENT AND TRADEMARK OFFICE
CERTIFICATE OF CORRECTION

PATENT NO. : 11,715,071 B2
APPLICATION NO. : 17/196619
DATED : August 1, 2023
INVENTOR(S) : Yamane It is certified that error appears in the above-identified patent and that said Letters Patent is hereby corrected as shown below:

In the Claims

In Column 12, Claim 10, Line 45, delete "claim 3," and insert -- claim 9, --, therefor.

Signed and Sealed this
Thirteenth Day of August, 2024

Katherine Kelly Vidal
*Director of the United States Patent and Trademark Office*